United States Patent

[11] 3,632,050

| | | | |
|---|---|---|---|
| [72] | Inventor | John L. Lee | |
| | | Reamstown, Pa. | |
| [21] | Appl. No. | 23,608 | |
| [22] | Filed | Mar. 30, 1970 | |
| [45] | Patented | Jan. 4, 1972 | |
| [73] | Assignee | Sperry Rand Corporation | |
| | | New Holland, Pa. | |

[54] ENDGATE FOR A MANURE SPREADER
13 Claims, 5 Drawing Figs.

| | | |
|---|---|---|
| [52] | U.S. Cl. | 239/676 |
| [51] | Int. Cl. | A01c 19/00, E01c 19/20 |
| [50] | Field of Search | 239/676, 680 |

[56] References Cited
UNITED STATES PATENTS

| 3,170,699 | 2/1965 | Smith et al. | 239/676 |
| 3,253,834 | 5/1966 | Bing et al. | 239/676 |
| 867,019 | 9/1907 | Dennis et al. | 239/676 |
| 2,711,902 | 6/1955 | Martin | 239/676 |
| 3,123,363 | 3/1964 | Hedtke | 239/676 |
| 3,241,841 | 3/1966 | Kucera | 239/676 X |

*Primary Examiner*—Lloyd L. King
*Attorneys*—Joseph A. Brown, John C. Thompson, James J. Kennedy and George C. Bower

ABSTRACT: An endgate mechanism for a manure spreader. The endgate is pivotally suspended at its upper portion by a pivotable U-shaped yoke mounted transversely on the manure spreader and pivotally secured at its side by a pair of pivotably drag links. The yoke and drag links form a modified four-bar linkage and when particularly arranged enable the endgate to be lifted from a closed position to an intermediate open position in a relatively flat arc. As the endgate lifts further upward the drag links become effectual and tend to tilt the lower portion of the gate upwardly and rearwardly such that the gate is in a general horizontal orientation at its fully raised position.

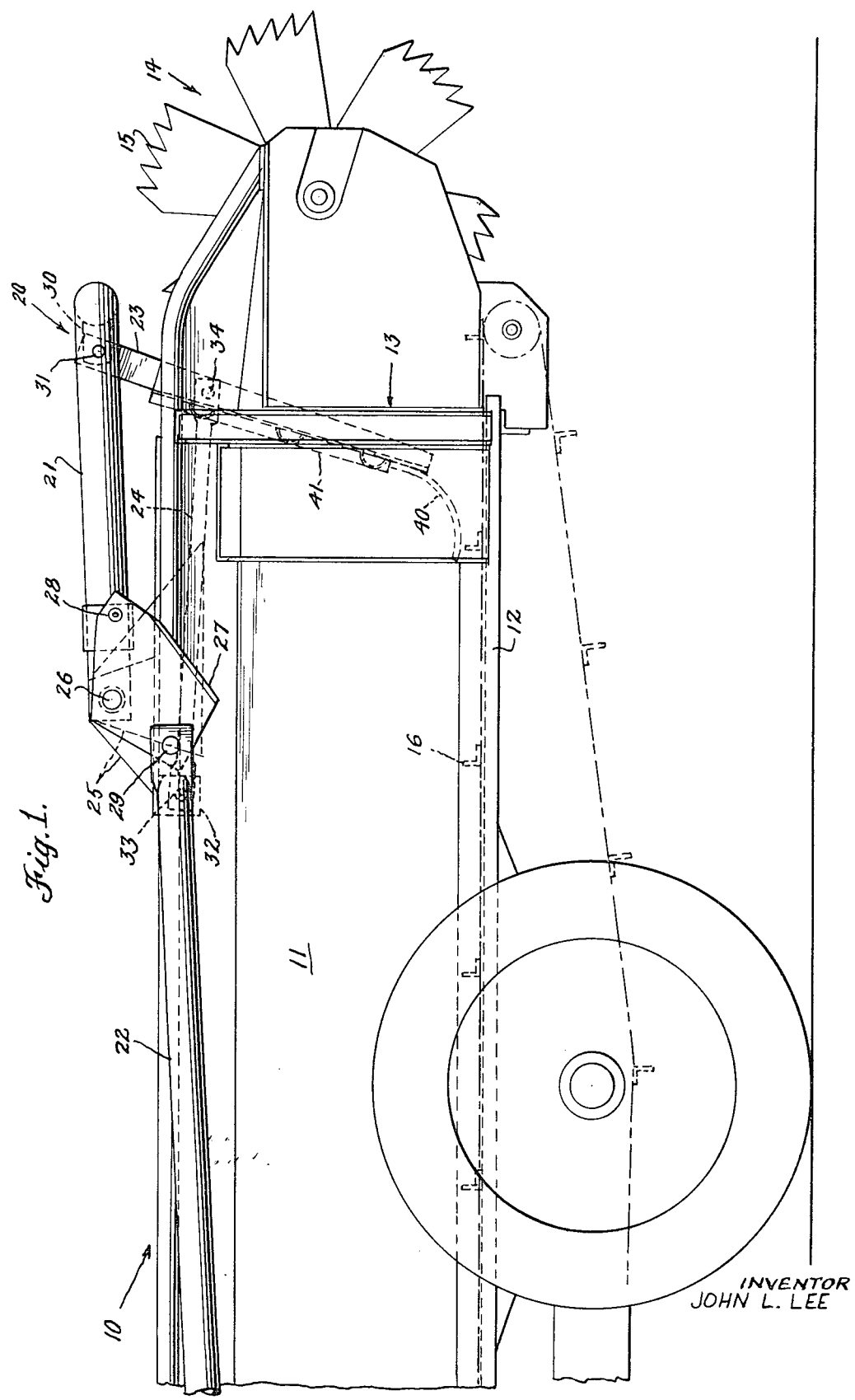

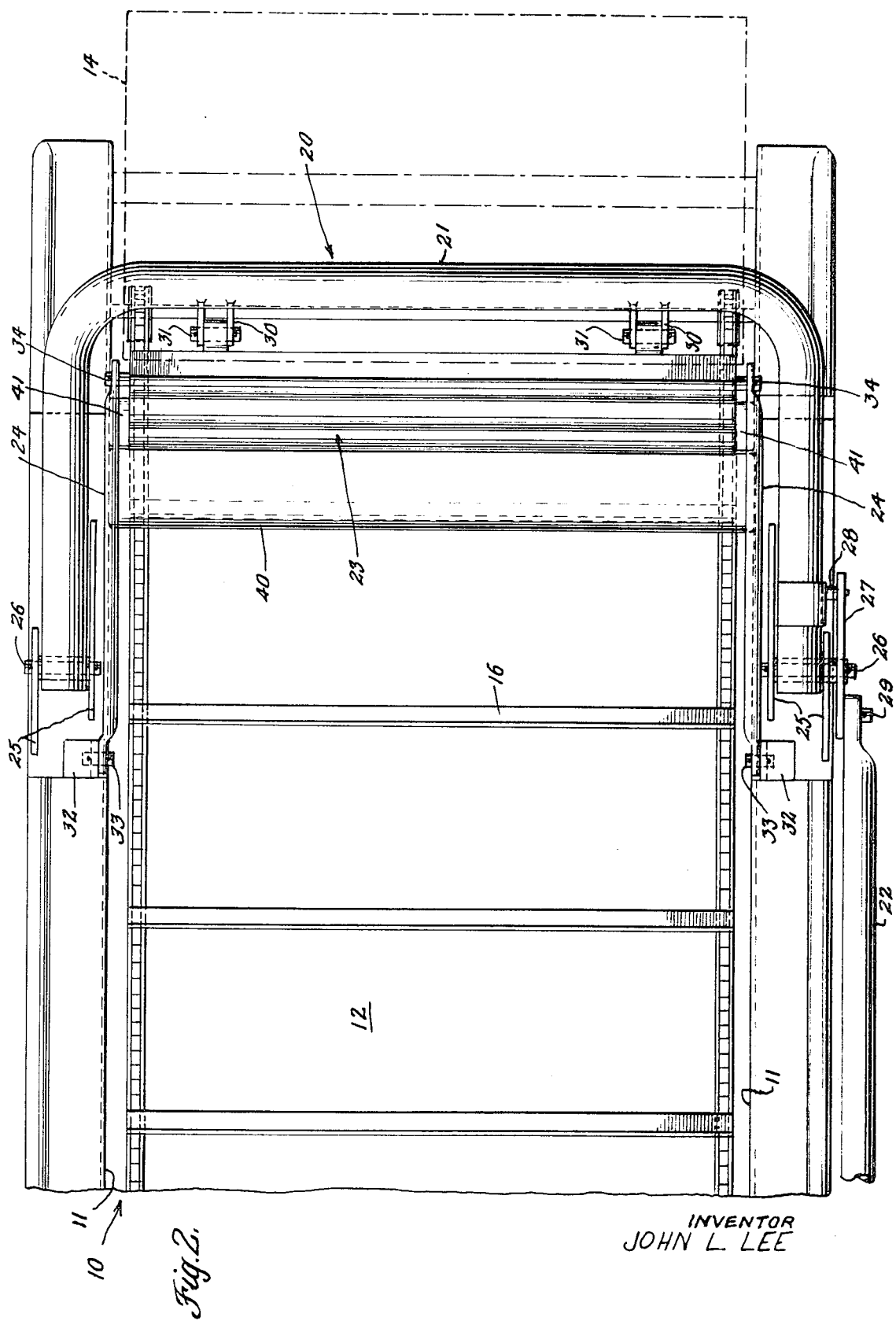

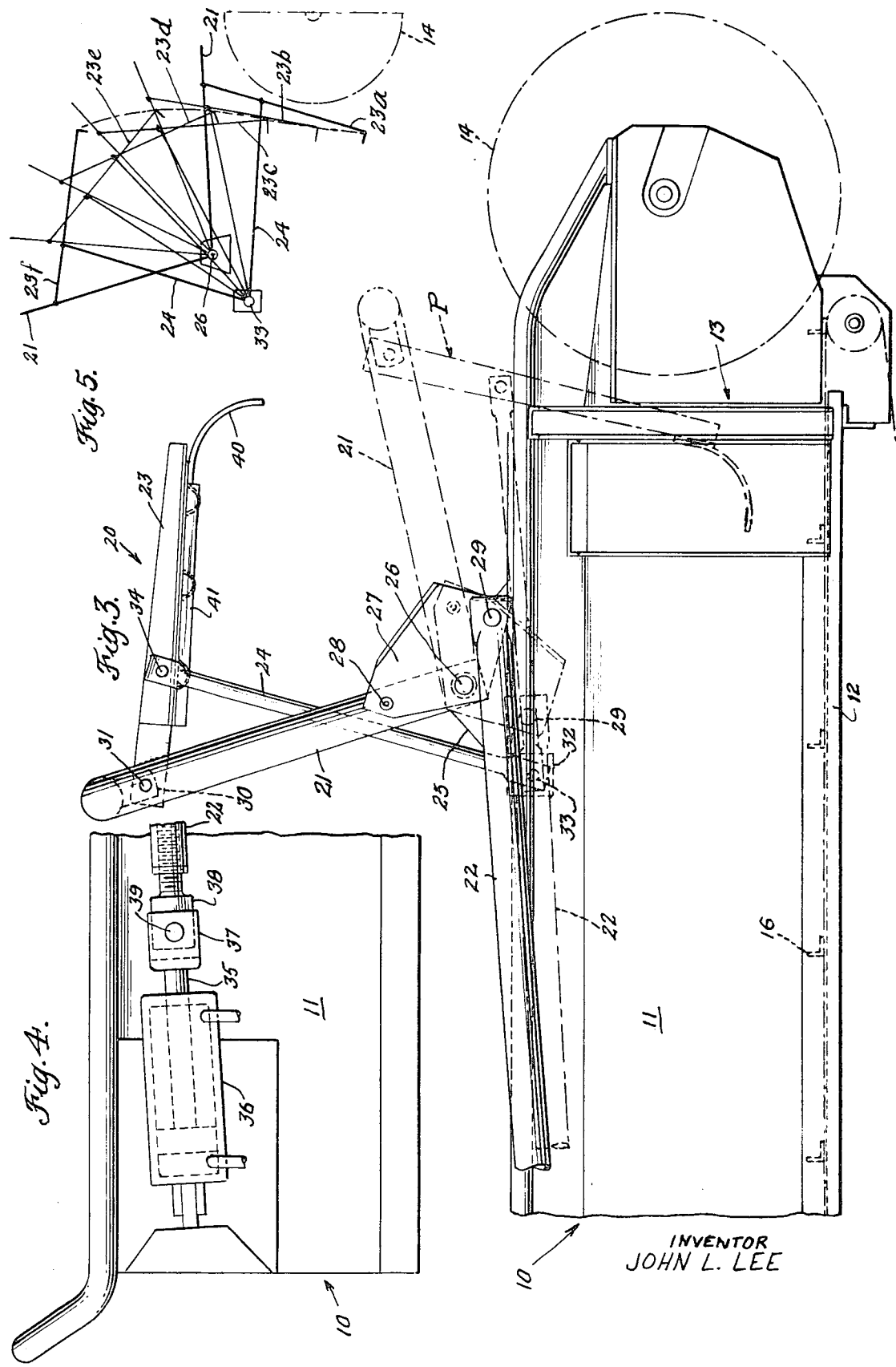

ENDGATE FOR A MANURE SPREADER

BACKGROUND OF THE INVENTION

This invention relates to manure spreaders and more particularly to an endgate mechanism for retaining manure within manure spreaders.

In the past, endgates have commonly been fixedly attached to a pair of pivotable arms, as shown in U.S. Pat. No. 3,253,834. In order to maximize the capacity of such type manure wagons it has been necessary to position the gate near the rear of the wagon, closely adjacent to the spreading mechanism. To prevent the lower portions of the gate from arcing into the spreading mechanism, designers have used long pivotable arms which provide a relatively flat lift during the initial stage of opening. The long arms create a high torque requirement which must be overcome to actuate the gate. Consequently, to avoid the risk of failure, the actuating components must be of a durable high strength material to withstand the stress incurred during actuation. Of particular importance is the strength of the pivotable arms since the actuating force is normally applied from a single side and unless the arms are of substantial strength the gate will tend to twist and bind between the sides of the spreader. In addition, the fixed endgate in its raised position often significantly restricts the rearward vision of the operator and prohibits him from adequately observing the spreading operation.

One object of the present invention is to overcome the disadvantages of the prior art.

Another object of the present invention is to provide a four-bar gate-actuating linkage for a manure spreader such that the endgate may be placed closely adjacent the spreading mechanism and be raised by linkages of relatively short moment arm, thereby minimizing the torque requirement of actuation and avoiding the costly and awkward actuating components of the prior art.

A further object of the present invention is to provide an opening and closing endgate for a manure spreader that is situated to the rear of the spreader, closely adjacent the spreading mechanism so as to maximize the holding capacity of the spreader.

Another object of the present invention is to provide an endgate for a manure spreader with a linkage arrangement that will guide the gate into a generally flat horizontal orientation at its fully raised position so as to minimize the rear visual obstruction of the operator in observing the spreading operation.

More specifically it is the object of the present invention to provide an endgate mounting and actuating means for moving the endgate between a closed retaining position and a fully raised spreading position by pivotally suspending the endgate from a revolvable yoke and linking the gate furtherly with a pair of pivotable drag links such that the gate is moved in a relatively flat vertical arc between the closed retained position and a point intermediate the level of the spreading mechanism and is moved in a relatively curved horizontal arc between the point intermediate the level of the spreading mechanism and the fully raised spreading position.

Other objects and advantages of the present invention will become apparent and obvious from a study of the following description and the accompanying drawings which are merely illustrative of the present invention.

DESCRIPTION OF THE DRAWINGS

FIG. 1 is a side elevation of a manure spreader having endgate mechanism constructed in accordance with the invention, with the endgate shown in its closed position;

FIG. 2 is a plan view of FIG. 1;

FIG. 3 is a side elevation showing the endgate in full open position in full lines and in a partially open position in broken lines;

FIG. 4 is a fragmentary elevational view of the front portion of the manure spreader illustrating the piston and cylinder device employed to actuate the gate; and FIG. 5 is a view diagrammatically illustrating the progress of the endgate from its fully closed position to its fully open position and showing the physical relation of the endgate to the manure distributing or beater unit of the equipment.

Referring now to the drawings in detail the reference numeral 10 indicates the load-carrying body or wagon of a conventional style manure spreader having sidewalls 11, 11, a fixed bottom 12, an open rear 13, a material spreading unit 14 having beaters 15 of known form, and an apron conveyor 16 operable along the bottom 12 to convey manure rearwardly to the spreading unit 14. The drive mechanism for the spreading unit 14 and the apron conveyor 16 form no part per se of the present invention and suffice it to say that the unit 14 is driven from a gearbox by means of suitable chains and sprockets and that the apron conveyor 16 is driven in step-by-step movement by known ratchet mechanism.

The improved endgate construction of the present invention is indicated as a whole by the reference numeral 20 and comprises in general an actuating arm in the form of a pivoted yoke 21, a push rod 22 for actuating the yoke, an endgate 23 pivotally carried by the yoke 21 and pivoted drag links 24, 24 connected to the endgate 23.

For purposes of lightness of weight the push rod 22, the yoke 21 and the drag links 24, 24 are of tubular form and the endgate 23 is of plate form with suitable reinforcing ribs.

The yoke 21 is pivotally mounted on the body of wagon 10 by means of rigid brackets 25, 25 secured to the sidewalls 11, 11 of the body 10 and conveying pivot pins 26. A wing plate is pivotally mounted on the pin 26 of one of the brackets and is attached to the adjacent leg of the yoke 21 by a shear pin 28 (FIG. 1 and 2). The push rod 22 is connected to the wing plate 27 by a pin 29.

The endgate 23 is pivotally carried by the yoke by means of longitudinally spaced ears 30, 30 (FIG. 2) secured to the yoke as by means of welds, and pivot pins 31, 31 carried by the ears. Thus, as seen in FIG. 1 the endgate is suspended from the yoke. The drag links 24, 24 are pivotally mounted at one end, in brackets 32, 32 secured to the body 10, by means of pivot pins 33, 33. As seen in FIG. 1 the brackets 32 are secured to the body at a point below and forwardly of the yoke supporting brackets 25, 25. The other ends of the drag links are connected to the endgate by pivot pins 34, 34 carried by the gate at a point well toward the pivot 31 of the gate.

The push rod 22 for actuating the endgate as mentioned above is connected at one end to the wing plate 27 by pin 29 and at its other end (FIG 4) it is connected to the piston rod 35 of a piston and cylinder device 36. This end of the push rod is connected to the clevis 37 of the piston rod 35 by means of a threaded adjustable head 38 and pin 39 to provide for push rod adjustment. The piston and cylinder device 36 is actuated by hydraulic pressure from a tractor propelling the manure spreader in known manner and is under control of the tractor operator.

Having thus described the various components of the present invention, the particular functioning of and advantages of the novel endgate actuating system of the invention will now be pointed out.

In FIG. 1 the endgate 23 is shown in its down position at the extreme rear or open end of the load-carrying body or wagon and just forward of the spreading unit 14. In this position the body can be loaded with manure ranging in consistency from solid to fluid. On this connection it will be observed that the endgate 23 is provided with a flexible bottom seal 40 and flexible side seals 41, 41 to prevent leakage of fluid manure in transit.

In the field where spreading of manure is to take place the operator activates the piston and cylinder device 36 to actuate the push rod 22 in its gate opening direction thus causing the yoke 21 to pivot upwardly carrying the pivoted endgate 23 with it. If the gate is to be raised to its full open position shown in full lines in FIG. 3 he activates the piston and cylinder device in its full opening stroke. However, it is noted that the operator can control the range of gate opening from a very small amount, when operating with fluid manure for example, to a full opening when operating with solid manures. An intermediate part open position of the gate is shown in broken lines at P in FIG. 3.

A graphic illustration of the travel of the gate from its closed position to its fully open position is shown in the diagram of FIG. 5 from which it will be seen that the geometry of the interconnected components of the gate-actuating mechanism is such that during the first degrees of upward gate opening rotation of the yoke 21 the gate 23 remains close to its original planar relationship, for example, as shown by positions 23a, and 23b in FIG. 5. As the rotation of the yoke progresses further the planar surface of the gate starts leaning from the initial upright position toward a horizontal position as shown by positions 23c 23d, and 23e in FIG. 5, and in the final rotation of the yoke to full gate-opening position the planar surface of the gate assumes the substantially horizontal position as shown by position 23f in FIG. 5.

It is also to be observed from FIG. 5 that the bottom edge of the gate, in travelling from position 23a to position 23f describes a relatively flat lifting arc. Thus, the above-described improved actuating system advantageously makes it possible with a short lifting arm or yoke 21 to raise the gate in a relatively flat lifting arc which enables the gate to be positioned close to the spreading unit 14 and thereby increase the load-carrying capacity of the body or wagon 10 over that of wagons employing known types of endgates.

Stated in another way, due to the geometry of the linkage the gate first moves vertically upwardly directly in front of the spreader unit and then in its final opening movements it swings to its substantially horizontal position.

Also due to the comparatively short actuating arm or yoke 21, the effort required to raise the gate is low since a smaller moment arm is involved. Thus, the components of the system can be of light construction without risk of failure.

Although the device has been described above as being operated by a power piston and cylinder device it is contemplated in some instances to employ handcrank operation of the gate, this being possible because of the lightness of construction of the device, its ease of operation and the extremely low effort required.

This this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. An endgate mechanism for a manure spreader, which comprises in combination:
    a wagon having a floor, a front end and a pair of sides disposed vertically about the floor, and an open rear end;
    a spreading mechanism mounted transversely the open rear end of said wagon for chopping and spreading manure;
    an endgate mounted adjacent said spreading mechanism for vertical movement between a closed retaining position and a fully raised spreading position; and
    means for mounting said endgate on said wagon for vertically moving said endgate between the closed retaining position and the fully raised spreading position such that said endgate moves in a relatively flat vertical arc between the closed retaining position and a point intermediate the level of the spreading mechanism and moves in a relatively curved horizontal arc between the point intermediate the level of the spreading mechanism and the fully raised spreading position, said mounting means including a four-bar linkage having a driver arm connected pivotally to said endgate for driving said endgate, and a pivotal drag link means connected pivotally to said endgate for guiding said endgate during movement.

2. An endgate mechanism for a manure spreader as described in claim 1 wherein said driver arm includes a yoke member pivotally mounted transversely of said wagon for pivotally carrying said endgate and wherein said drag link means includes a pair of drag links pivotally mounted in axial alignment to said wagon and connected pivotally to corresponding portions of said endgate.

3. In a manure spreader having a floor, a front end and a pair of sides correspondingly disposed vertically about said floor, an open rear end, a spreading mechanism mounted transversely said open rear end for chopping and spreading manure, and an endgate disposed in said open rear end forwardly of said spreading mechanism, the improvement comprising: a four-bar endgate actuating linkage, said four-bar linkage including a driver arm pivotally mounted at one end to said manure spreader and pivotally connected at the other end to said gate, and a following rigid drag link pivotally mounted to said manure spreader and pivotally connected to said gate for guiding the movement thereof as said endgate is driven by said driver arm.

4. An endgate mechanism for a manure spreader as described in claim 3 wherein said driver arm means includes a first and a second driver arm pivotally mounted in axial alignment to corresponding sides of said manure spreader and further pivotally connected to corresponding portions of said endgate and wherein said drag link means includes a pair of drag links pivotally mounted in axial alignment to corresponding sides of said manure spreader and further pivotally connected to corresponding portions of said endgate, thereby forming a four-bar linkage to each side of said gate for actuating the same.

5. An endgate mechanism for a manure spreader as described in claim 3 wherein said driver arm means is driven by a hydraulic piston and cylinder device and a link connecting said hydraulic piston and cylinder device with said driver arm.

6. An endgate mechanism for a manure spreader having a floor, a front end and a pair of sides correspondingly disposed vertically about said floor, an open rear end, and a spreading mechanism mounted transversely of said open rear end for chopping and spreading manure, the improvement comprising:
    an endgate mechanism including a revolvable yoke disposed transversely of said manure spreader forward of said spreading mechanism, an endgate pivotally suspended about its upper portion to said yoke for movement therewith, a pair of corresponding pivotable drag links each mounted in axial alignment to one of the sides of said manure spreader and pivotally connected to corresponding portions of said end gates for guiding said endgate as it is moved by said yoke;
    means disposed about one side of said manure spreader for providing power to actuate said endgate mechanism;
    and a link connected at one end to said power means and connected at the other end to said yoke for transferring power therealong for actuating said endgate mechanism.

7. An endgate mechanism for a manure spreader as described in claim 6 wherein the power means is a hydraulic piston and cylinder device, wherein said link connecting said power means and said yoke is adjustable, and wherein the connection between said yoke and said link contains a shear pin.

8. In a manure spreader the combination of a wagon having a rear open end, an apron conveyor operable to convey material in said wagon toward said rear open end, beater means at said open end for scattering material onto the ground, an endgate for said rear open end of the wagon positioned closely adjacent said beater means and means for opening and closing said endgate, said opening and closing means comprising, a drive arm pivotally connected at one end to said wagon and pivotally connected at the other end to a top portion of said endgate, a drag link pivoted at one end on said wagon forwardly of said drive arm's pivotal connection with said wagon and pivotally connected at its other end to a point intermediate the upper and lower portions of said endgate for pivoting said endgate relative to said drive arm as said endgate is opened and closed, said drive arm and drag link forming a four-bar linkage, and means for imparting pivotal movement to said drive arm to open and close said endgate.

9. A construction in accordance with claim 8 and further including a fixed bracket mounted at a side of said drive wagon on which said arm is pivoted and a second fixed bracket mounted on said side of said wagon on which one end of said drag link means is pivoted.

10. A construction in accordance with claim 8 in which said means for imparting pivotal movement to said pivoted arm includes a hydraulic piston and cylinder device and a link connecting the piston of said device to said pivoted arm.

11. A construction in accordance with claim 10 wherein said connecting link is adjustable.

12. A combination in accordance with claim 8, wherein said endgate is provided with side and bottom sealing means acting as a seal between said gate and the sides and bottom of said wagon whereby leakage of fluid materials out of the wagon is prevented when the gate is closed.

13. In a manure spreader comprising a load-carrying body having sidewalls, a fixed bottom and a normally open rear, a material spreading unit disposed at said open rear, an apron conveyor operable along said bottom to convey material rearwardly to said material spreading unit, the combination of an openable and closeable endgate positioned between said open rear and said spreading unit in close proximity to said unit and means for opening and closing said endgate including an actuating generally U-shaped yoke member pivotally connected about corresponding opposite end portions to the sidewalls of said load-carrying body, means for pivotally mounting said endgate to said yoke, a pair of corresponding drag links, each pivotally connected at one end to the sidewalls of said load-carrying body and pivotally connected at the other end to said endgate, said drag links being particularly spaced relative to said yoke for pivoting said endgate relative to said yoke as the endgate is opened and closed, and power means for actuating said yoke to impart opening and closing movement to said endgate.

* * * * *